United States Patent
Lupu et al.

(10) Patent No.: US 6,745,385 B1
(45) Date of Patent: Jun. 1, 2004

(54) FIXING INCOMPATIBLE APPLICATIONS BY PROVIDING STUBS FOR APIS

(75) Inventors: Corneliu I. Lupu, Redmond, WA (US); John D. Colleran, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/513,016

(22) Filed: Feb. 25, 2000

Related U.S. Application Data

(60) Provisional application No. 60/151,853, filed on Sep. 1, 1999.

(51) Int. Cl.[7] .............................. G06F 9/44; G06F 9/45; G06F 9/00
(52) U.S. Cl. .................... 717/163; 717/148; 717/166; 717/168; 709/310; 709/328
(58) Field of Search ................. 717/148, 168, 717/163, 166; 709/310, 328

(56) References Cited

U.S. PATENT DOCUMENTS

| | | | |
|---|---|---|---|
| 5,335,344 A | * | 8/1994 | Hastings ..................... 714/35 |
| 5,430,878 A | | 7/1995 | Straub et al. |
| 5,546,586 A | | 8/1996 | Wetmore et al. |
| 5,675,803 A | * | 10/1997 | Preisler et al. ............... 717/131 |
| 5,790,856 A | * | 8/1998 | Lillich ......................... 717/168 |
| 5,815,722 A | * | 9/1998 | Kalwitz et al. .............. 717/178 |
| 5,916,308 A | | 6/1999 | Duncan et al. |
| 5,951,639 A | * | 9/1999 | MacInnis ..................... 709/220 |
| 6,009,261 A | * | 12/1999 | Scalzi et al. ................... 703/26 |
| 6,026,238 A | * | 2/2000 | Bond et al. .................. 717/163 |
| 6,071,317 A | * | 6/2000 | Nagel ......................... 717/131 |
| 6,141,698 A | * | 10/2000 | Krishnan et al. ........... 709/331 |
| 6,463,583 B1 | * | 10/2002 | Hammond ................... 717/168 |
| 6,484,309 B2 | * | 11/2002 | Nowlin et al. .............. 717/137 |
| 6,490,721 B1 | * | 12/2002 | Gorshkov et al. .......... 717/130 |
| 2002/0073398 A1 | * | 6/2002 | Tinker ......................... 717/110 |
| 2003/0110307 A1 | * | 6/2003 | De Armas et al. .......... 709/310 |

FOREIGN PATENT DOCUMENTS

| | | |
|---|---|---|
| EP | 0 498 130 A2 | 8/1992 |
| EP | 0 559 221 A2 | 9/1993 |

* cited by examiner

*Primary Examiner*—Kakali Chaki
*Assistant Examiner*—Qamrun Nahar
(74) *Attorney, Agent, or Firm*—Christensen O'Connor Johnson Kindness PLLC

(57) ABSTRACT

A computer method for patching applications that are incompatible with an operating system is provided. The method determines if an application is compatible with an operating system, and if the application is determined to be incompatible, a shim dynamic link library is loaded that replaces all of the incompatible functions contained within the application's dynamic link libraries.

37 Claims, 7 Drawing Sheets

FIXING INCOMPATIBLE APPLICATIONS BY PROVIDING STUBS FOR APIS

RELATIONSHIP OF OTHER APPLICATION

This application claims the benefit of U.S. Provisional Application Serial No. 60/151,853, filed Sep. 1, 1999.

FIELD OF THE INVENTION

The present invention relates to software, and more specifically, to making incompatible software applications compatible with an operating system.

BACKGROUND OF THE INVENTION

In today's rapidly moving software field many applications are programmed specifically for the operating system in use at the time the application is developed. While programming specifications are typically provided to application developers by the operating system developers, sometimes these procedures and rules are not followed. As a result, many applications may not work correctly under a new release of an operating system. This can result from many different factors, including not following the programming specifications or making assumptions about how the operating system operates. For example, an application developer may believe that a certain type of file is always stored at a specific location in the computer, and instead of requesting the location of the file from a function in the operating system, as the programming specifications indicate, the programmer will specifically input the path of the file location into the application code. Additionally, a programmer may rely on the fact that a certain function of the operating system only returns a certain value if an error occurs within that function. For example, if previous versions of the operating system returned a value of negative one to indicate an error, the programmer may assume that only a negative one value will be returned in the future. An operating system change, however, may have modified the function to return other values based on the error, thereby potentially causing the program to not work correctly in all situations under the operating system.

In other instances, a program may seem to operate correctly under one version of an operating system even though it contains errors. This can occur when the older version of the operating system does not detect or enforce the error contained within the application. A new release of the operating system, however, may check for these previously unchecked conditions, thereby causing the application to be incompatible with the new version of the operating system.

Further creating incompatible applications is the fact that as the popularity of the operating system increases, the problem of incompatible applications also increases. For example, if an operating system has become popular during its release, there will be thousands of applications written specifically for that operating system. The large number of applications, as well as the diverse group of application developers, can result in many programs not working correctly when a new version of an operating system is released.

Users of currently working applications may not want to switch to a newer operating system if their applications are incompatible with the new operating system. To attempt to solve this problem, application developers have been required to fix their applications themselves, or operating system developers have included patches that are integrated into the new version of the operating system to fix many of the known problem applications so that they may function correctly under the new operating system.

The operating system patch approach, however, creates many problems. First, patches may add a significant amount of data to the operating system that may significantly increase the space requirements of the operating system. Second, all applications are required to operate through this additional patch layer even though many applications are compatible with the new operating system. This can cause programs to run slower. Third, the operating system programming code may become very cluttered due to the number of programs that may need to be fixed. This cluttered code makes it more difficult for operating system developers to make changes and improvements to the operating system. Finally, it is impossible for a developer to know all of the applications that will not work correctly when the new operating system is first released. Therefore, subsequent patches must be made to the operating system in order to allow these programs to work correctly. This in turn adds another layer to the already complex operating system causing the operating system to operate in a less efficient manner.

SUMMARY OF THE INVENTION

The present invention is directed to providing a system and method for patching an application that would not otherwise be compatible with the operating system of the computer on which the application is run. In accordance with the invention, a dynamic link library (DLL) is inserted into the incompatible application's address space. The DLL determines the functions in the incompatible application that need to be patched and patches those functions.

It will be appreciated that the DLL is only loaded by the operating system for those applications that have been identified as being incompatible with the operating system. Therefore, applications that are compatible with the operating system are not required to go through an additional operating system level while executing, thereby preserving system resources.

One embodiment of the invention works in the following way. First, the user starts an application. Second, the application is identified as being compatible or incompatible with the operating system. To determine if the application is incompatible, identifying information from the application is checked against a database containing a list of applications that are currently known to be incompatible. If the name of the application is in the database then a set of attributes are checked to see if that particular version of the application is compatible. If all of the checked attributes match the ones found in the database, the application is determined to be incompatible with the current operating system.

If the name of the application is not found in the database, the application is determined to be compatible with the current operating system. If the application is determined to be compatible, the application runs normally. If the application is determined to be incompatible, the operating system loads a DLL into the application's address space that acts as a shim between the application and the operating system. The Shim DLL contains the program code necessary to apply the patches that are contained in a separate DLL, which is referred to as a Hook DLL. The Hook DLL contains the actual program code required to patch the incompatible application.

After loading the Hook DLL, the Shim DLL analyzes the contents of the Hook DLL to determine what functions need to be patched in the application. In one embodiment of the present invention, the Hook DLL may also contain: the name of the module where the incompatible function is located; the function name that is incompatible; the stub functions that should be called in order to fix the problem; and the list of the application's DLLs that need to be patched. The information contained in the Hook DLL is then used by the Shim DLL to patch the incompatible application's program code.

After the Shim DLL and Hook DLL are loaded by the incompatible application the remaining DLLs required for the application are loaded. Each of the loaded DLLs has an import table that maintains a list of the functions and function pointers that are contained within the DLL. The Shim DLL replaces the incompatible function pointer(s) in the DLL with the updated function pointer contained within the Hook DLL.

In accordance with other aspects of this invention, in addition to patching DLLs as they are loaded at runtime, a method and system for patching a DLL that is dynamically loaded during the execution of an application are provided. In order to correct incompatibilities within the dynamically loaded DLL the operating system patches by default a few system APIs that an application would use to dynamically link to a DLL and call APIs from that DLL.

As will be appreciated by those of ordinary skill in the art from the foregoing summary, the present invention provides an efficient method of patching incompatible applications.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The present invention is directed to a computer method and system for patching incompatible applications. More specifically, the invention is ideally suited for use in patching applications that would not otherwise work properly when executed under the operating system running on the computer executing the application. Briefly described, the invention identifies applications as being compatible or incompatible with the operating system, and if the application is determined to be incompatible, inserting a Shim DLL into the application's address space that patches the incompatible application.

Figure 1:
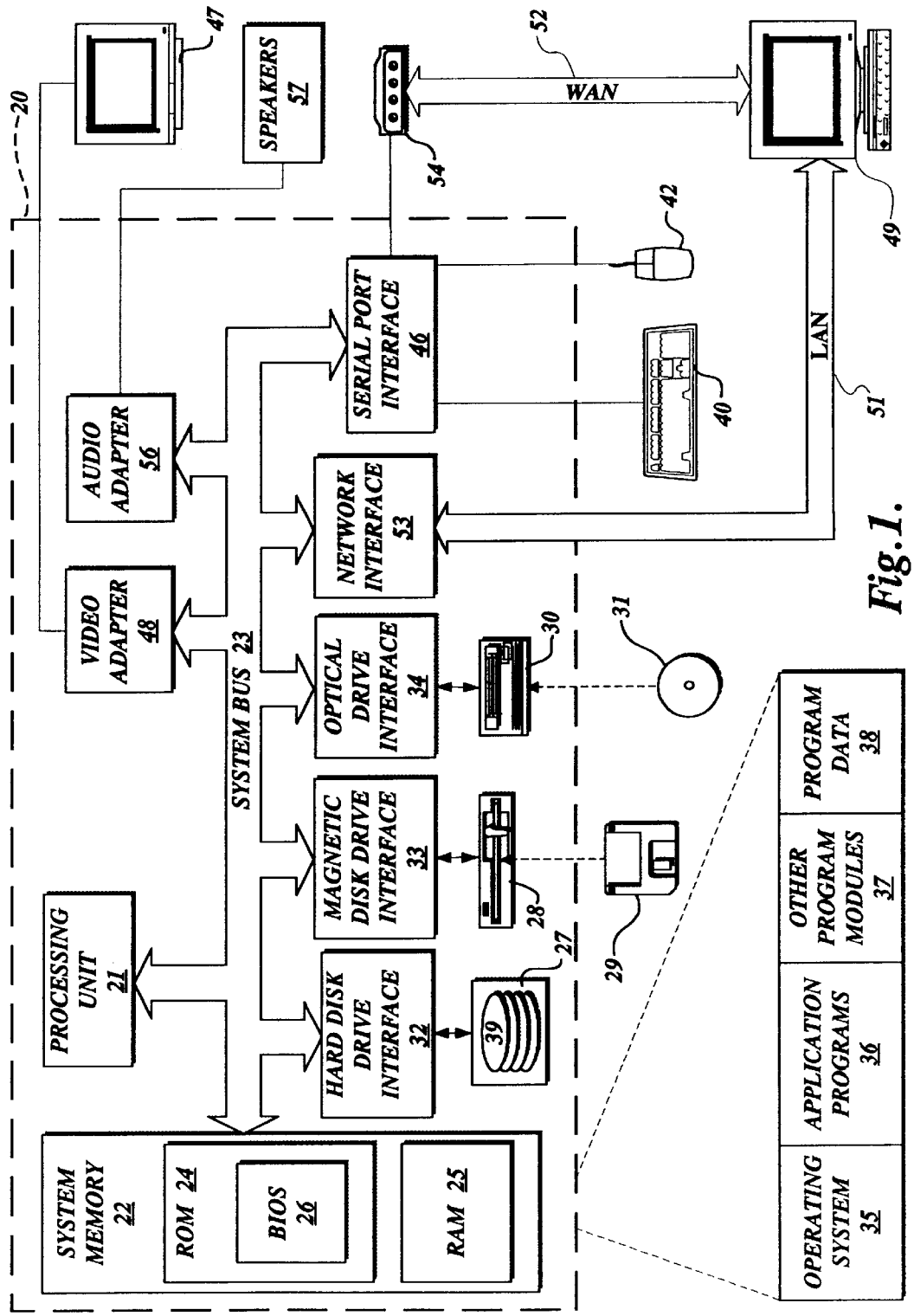
FIG. 1 is a block diagram of a computer suitable for providing an exemplary operating environment for the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, ZIP disks, and the like, may also be used in the exemplary operating environment.

A number of program modules may be stored in the drives and RAM 25, including an operating system 35, one or more application programs 36, other program modules 37, and program data 38. A user may enter commands and information into the personal computer 20 through input devices such as a keyboard 40 or a mouse 42. Other input devices (not shown) may include a microphone, touchpad, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
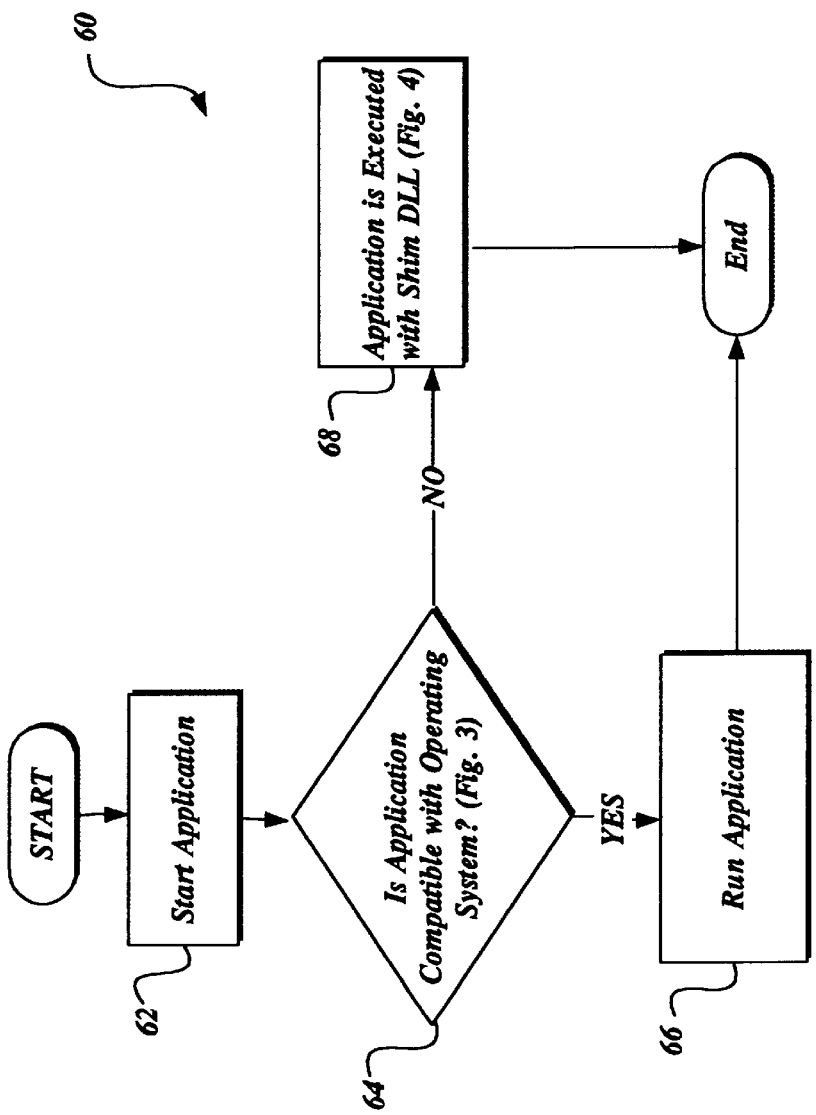
FIG. 2 is an overview flow diagram illustrating the invention.
Figure 3:
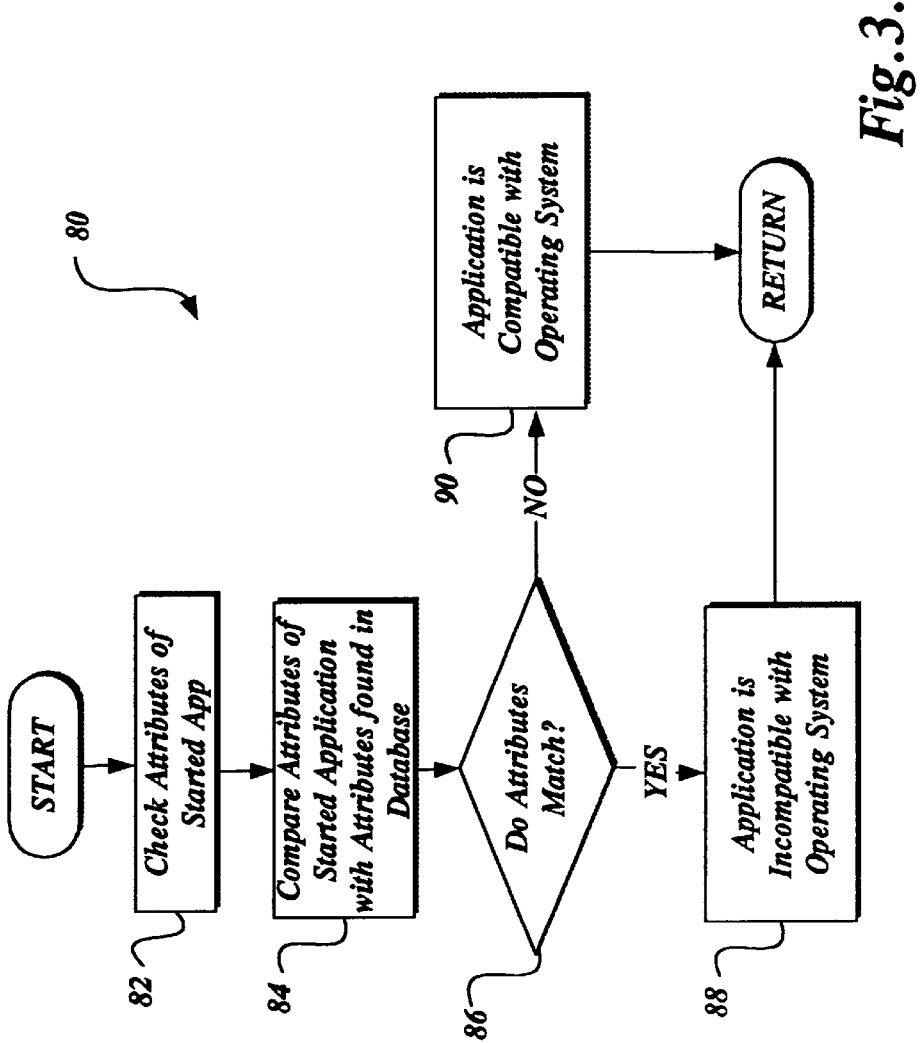
FIG. 3 is a flow diagram illustrating how an application is determined to be compatible or incompatible with an operating system.
Figure 4:
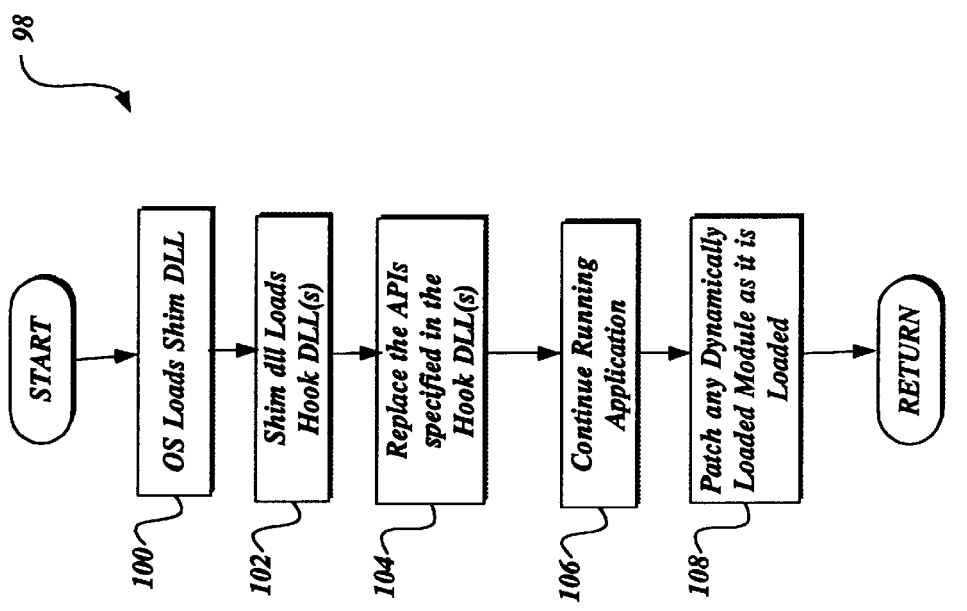
FIG. 4 is a flow diagram illustrating the logic of how an incompatible application is patched using a DLL.
Figure 5:
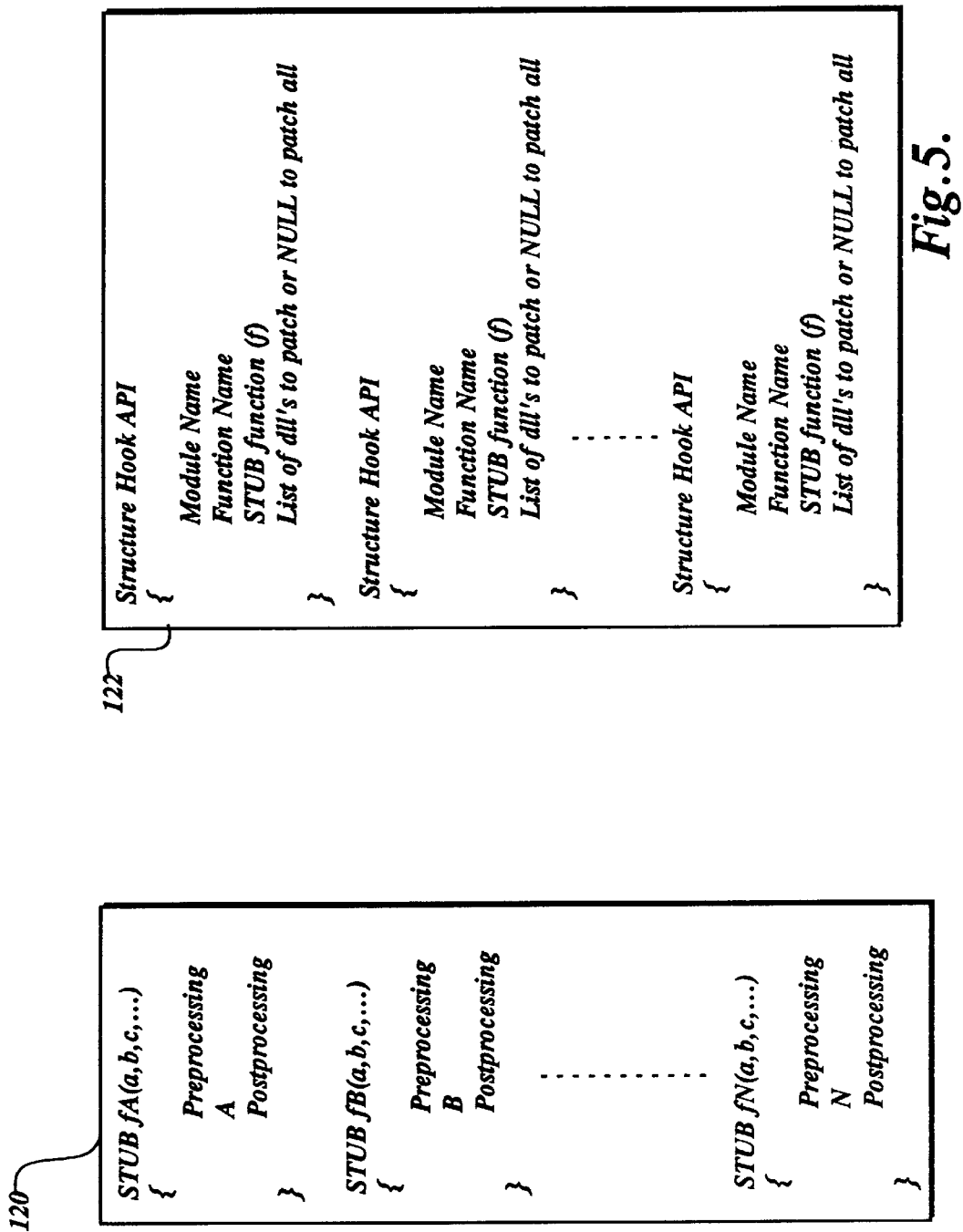
FIG. 5 is a diagram in pseudo-code of a Hook DLL.

The present invention is best described by reference to FIGS. 2–6, which graphically illustrate one embodiment of the present invention. FIGS. 2–4 illustrate the logic performed in determining an application's compatibility with an operating system and inserting a Shim DLL into an application's address space in order to patch an incompatible application. FIGS. 5 and 6 illustrate a Hook DLL and an example of how an incompatible application is patched by one embodiment of the present invention.

FIG. 2 is a flowchart illustrating an overview of the present invention. Block 62 illustrates starting an application. At decision block 64, a determination is made as to whether the application is compatible with the operating system. In one embodiment of the present invention, the operating system makes this determination. It will be appreciated by those of ordinary skill in the art that an application can be compatible with an operating system on varying levels. For example, an incompatible application may cause the operating system to halt the computer, or the incompatible application may operate as if the application contains no incompatibilities until a specified event, that is unlikely to happen, occurs. Therefore, an incompatible application is defined as an application that is identified as not working properly under an operating system. As will be appreciated by those of ordinary skill in the art, many applications could be identified as incompatible under this definition. In one embodiment of the invention, the application is identified as an incompatible application before the application begins to execute its program code. If the operating system determines that the application is compatible, then the application is run normally, as indicated by block 66. Otherwise, if the application is determined to be incompatible, the operating system loads a Shim DLL into the application's address space that is used to patch the application, as indicated by block 68. The application then runs until termination.

FIG. 3 illustrates in more detail the functions performed by decision block 64 of FIG. 2. More specifically, FIG. 3 is a flowchart illustrating one embodiment of the present invention for determining whether an application is compatible with the operating system of the computer that is to execute the application. Initially, at block 82, at least one identifying attribute, such as the name, of the started application is checked by the operating system. Other identifying attributes that can be checked, include but are not limited to: the version number of the header; the version number of the application; the company name; the checksum of the application; the release date of the application; the size of the application; the first six bytes of the application; or any other attribute that could be used to aid in identifying the application. As will be appreciated by those of ordinary skill in the art, any attribute or attributes can be chosen that uniquely identify the application.

Next, at block 84, the attributes of the started application are compared by the operating system with the attributes of applications that have been determined to be incompatible. In one embodiment of the present invention, some of the incompatible applications' attributes are stored in a database, specifically the Windows registry. It will be appreciated by those of ordinary skill in the art that the attributes could be stored at many different locations. For example, the attributes could be stored on the hard disk drive of the user's personal computer. Alternatively, the attributes could be stored at a remote location, such as a web server or remote host. When stored remotely, the identifying attributes can be downloaded through the Internet to the user's computer, or even read directly from a remote host. Still further, the identifying attributes could be stored on an optical or magnetic disk, or as mentioned above on a web server of a remote host. In one embodiment of the present invention, the database includes names of applications that are currently known to be incompatible with the operating system along with other identifying information. It will be appreciated by those of ordinary skill in the art that there are many tools that can be used to edit the registry database, including regedit.exe or regedit32.exe. By using these tools, or similar tools, the user can enter the incompatible application's identifying attributes into the registry.

The started application is determined to be incompatible with the current operating system if the identifying attributes of the started application are the same as the attributes of the identified incompatible applications. As mentioned above, in one embodiment of the present invention, the first identifying attribute compared is the name of the started application. The application is determined to be compatible with the current operating system if the name of the application does not match any of the names contained within the database. If the name of the started application matches the name contained within the database, additional identifying attributes are checked to determine if the application is incompatible with the operating system. It will be appreciated by those of ordinary skill in the art that an application can be identified many different ways and, as mentioned above, the set of identifying attributes compared could include many different identifying parameters. In some situations, one identifying attribute is sufficient to uniquely identify the incompatible application.

In one actual embodiment of the present invention, the identifying attributes are represented by binary data within the database. The first several bytes indicate the size of the identifying attributes that follow. It will be appreciated that the identifying attributes can be stored in an ASCII format, or some other computer readable format.

After the attributes have been checked (block 82) and compared (block 84) a test is made (decision block 86) to determine if the attributes of the started application match the attributes contained within the database. If the attributes that are compared match, as indicated by block 88, the application is determined to be incompatible with the operating system. If the attributes do not match as indicated by block 90, the application is determined to be compatible with the operating system. If the application is determined to be compatible, the application runs normally. Otherwise, the application is incompatible, as shown in FIG. 2 and noted above, the operating system loads a Shim DLL into the application's address space to patch the incompatible application. FIG. 4 illustrates in more detail the process for loading a Shim DLL.

FIG. 4 is a flow diagram illustrating the logic employed by one embodiment of the present invention to patch an incompatible application using a Shim DLL. At block 100, the operating system loads a Shim DLL into the application's address space. This occurs after the application is determined to be incompatible with the operating system (See FIG. 3). The Shim DLL forms a layer between the application and the operating system and provides the functionality needed to patch an application's DLLs import tables. In one embodiment of the present invention, the Shim DLL contains the program code necessary to apply the patches that are contained within a separate DLL, which, is referred to as a Hook DLL. It will be appreciated by those or ordinary skill in the art that the Shim DLL can also contain the patches for the application within the Shim DLL itself. The Shim DLL not only contains the functions (program code) necessary to apply the patches to the incompatible application but also includes program code that determines what functions need to be patched in the incompatible application, based on the Hook DLL.

After the Shim DLL is loaded into the application's address space, at block 102, the Shim DLL loads the Hook DLL(s) that contain the actual patches for the incompatible application. Once the Shim DLL is loaded, the operating system calls an initialization routine located within the Shim DLL that provides the name of the Hook DLL containing the stub functions that are used to patch the application. In one actual embodiment of the present invention, the Hook DLL contains all of the patches for applications that are known to be incompatible with the operating system when the Hook DLL is initially created. It will be appreciated by those of ordinary skill in the art that the patches do not need to be contained within one DLL, but may be contained in separate DLLs. For example, a separate Hook DLL could be created for each incompatible application. Additionally, separate Hook DLLs could be created based on the manufacturer of the product.

After loading the Hook DLL, the Shim DLL determines what functions need to be patched in the incompatible application. In one actual embodiment of the present invention, the Shim DLL creates an array of structures (see FIG. 5) that contains the information required to patch the applications. As will be appreciated by those of ordinary skill in this art, many different data structures could be used to store information about the functions that need to be patched. For example, a linked list data structure can be used. In one embodiment of the present invention, the Shim DLL contains a function referred to as GetHookAPI, which fills the structure array with the structures contained within the Hook DLL(s). GetHookAPI also returns the number of structures that was loaded out of the Hook DLL(s). The Hook DLL(s) contains a list of the functions that need to be patched in the application. The list in the Hook DLL also contains: the name of the module where the incompatible function is located; the function name that is incompatible; the stub functions that should be called in order to fix the problem; and the list of application DLLs that need to be patched. This information is then used by the Shim DLL to patch the incompatible applications.

Figure 6A:
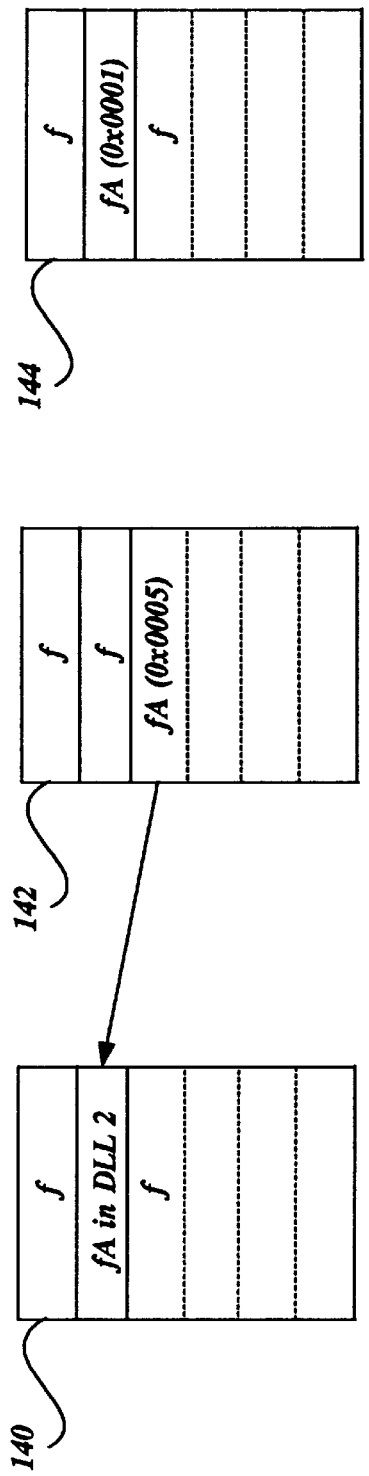
FIG. 6A is a diagram of import tables and the replacement of a generic function name with the pointer to the actual function.
Figure 6B:
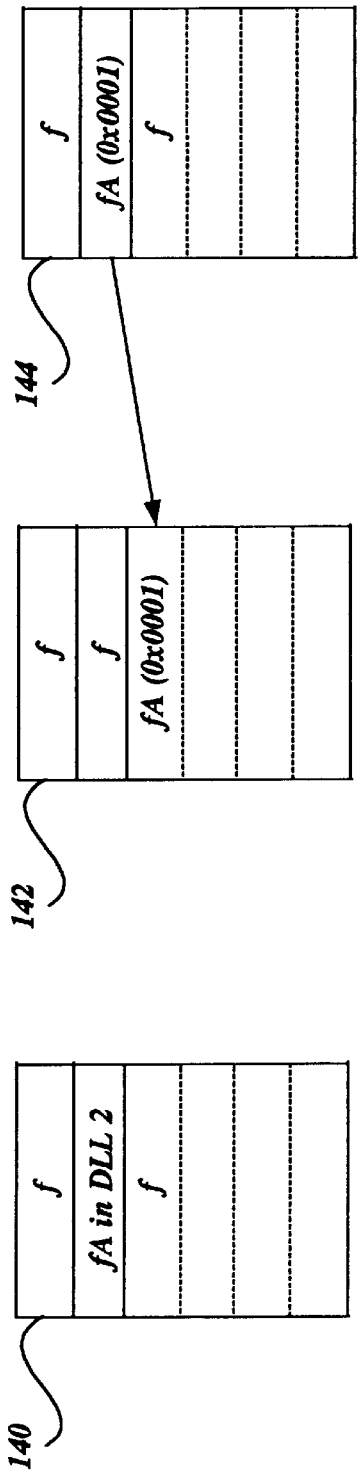
FIG. 6B is a diagram of import tables and the replacement of an incompatible function pointer with the value of the function pointer that is contained within a Hook DLL.
Figure 6C:
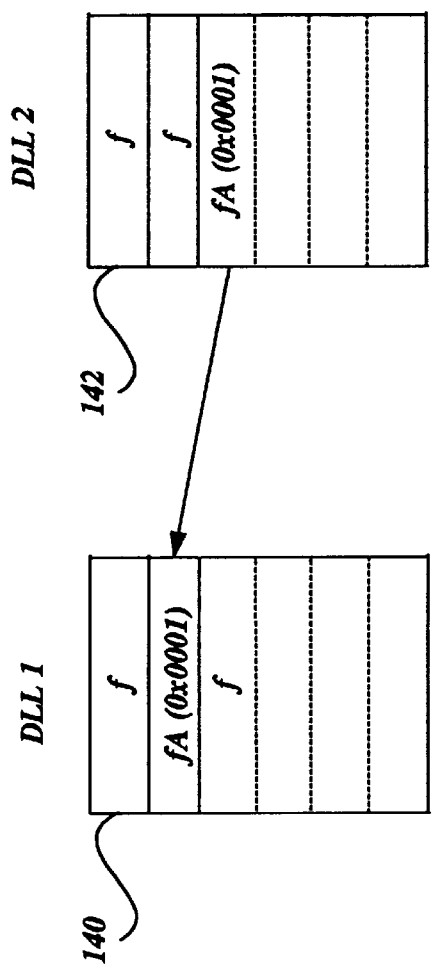
FIG. 6C is a diagram of import tables and the replacement of an incompatible function name with the corrected function pointer as supplied by the Hook DLL.

As block 104 of FIG. 4 illustrates, the APIs specified in the Hook DLL are replaced with the patched stub functions (See FIGS. 6A–C). Once the APIs specified in the Hook DLL are patched, as shown by block 106, the application is run normally.

An application may also call an incompatible function that is located in a DLL that was not initially loaded at runtime. In one actual embodiment of the invention, a hook is provided into the operating system that intercepts requests made by an incompatible application to dynamically load a DLL. More specifically, as shown by block 108, the operating system can be designed to patch any dynamically loaded module as it is loaded. In order to correct incompatibilities within the dynamically loaded DLL, the Shim DLL patches the system APIs that an application programmer utilizes to dynamically link a DLL. These functions, within Windows, are called CallProcAddress and LoadLibrary. For example, in the Windows operating system, if an application calls CallProcAddress ("fa") and ("fa") is an incompatible function that needs to be patched, the patched GetProcAddress will replace that function pointer with a patched function from the Hook DLL before returning the function pointer to the application. This helps to ensure that all processes are fixed before they are run, thereby creating a better mesh between the systems. As will be appreciated by those of ordinary skill in the art, other operating systems may have different functions used for the same purpose that can be patched in a similar manner.

As will be appreciated by those skilled in the art and others, some embodiments of the invention may not require patching of dynamically loaded DLLs. More specifically, if no DLLs are dynamically loaded while an incompatible application is running, there is no need to provide a hook into the operating system. As a result, the functions shown in block 108 and described above can be eliminated. Likewise, in other embodiments of the invention all incompatible functions may be patched when called at runtime, rather than prior to runtime. In this case, some or all of the functions shown in blocks 100, 102, and 104 can be eliminated.

FIG. 5 is a diagram in pseudo-code of a Hook DLL. Indicator 120 illustrates a group of stub functions that correct the incompatibilities of the functions that are contained within the incompatible application. In one actual embodiment of the invention, the Hook DLL contains stub functions for all of the applications functions that have been determined to be incompatible. The stub functions contain the code necessary to patch the incompatible functions. Typically, the stub functions include preprocessing code and post processing code wrapped around the function call to the incompatible function. Sometimes, however, the stub functions may not even call the incompatible function. For example, if an incompatible application merely requires the previous version of the application to be returned in order for the application to function properly under the operating system, the stub function will likely just return this value to the application. In one actual embodiment of the invention, there is a one-to-one relationship between a stub function and a Structure Hook API as illustrated by indicator 122.

Indicator 122 shows the Hook structure employed by one actual embodiment of the present invention. As can be seen by referring to FIG. 5, the Hook structure includes the module name, the function name, the stub function, and the list of DLLs to patch, or an indictor, such as NULL to patch all of the DLLs with the associated application. The Hook DLL contains one structure Hook API for each function that is incompatible within the application. As will be appreciated, however, by those of ordinary skill in the art, a single structure can be used to contain all of the information that are contained in the separate structures. Additionally, two or more different structures can call a single stub function. The module name indicates the module of the program that is incompatible. The function name indicates the function that has been determined to be incompatible in the applications. The Stub function(f) indicates the associated function contained within the Hook DLL that will be called instead of the incompatible function. The list of DLLs includes all of the incompatible application's DLLs that need to be patched in order for the application to be compatible. NULL is provided to indicate that all of the applications DLLs need to be patched.

FIGS. 6A–C are a sequence of diagrams that illustrate how one actual embodiment of the present invention replaces incompatible function contained within a DLL with the compatible stub function located within the Hook DLL. FIGS. 6A and 6B depict two DLLs associated with an application and one Hook DLL that is used to patch an incompatible application. Associated with each loaded DLL is an import table. The import tables 140, 142, and 144 depicted in FIGS. 6A–C include a list of functions and function pointers contained within the DLL. The import table may also include references, or pointers, to other functions located in a separate DLL, as indicated by DLL 1's import table 140. Generally, the Shim DLL patches the incompatible locations within the import table associated with the DLL which contains the incompatible function(s). As the application's associated DLLs are being loaded, the Shim DLL enumerates all of the information contained in the import table. The Shim DLL then searches the import tables for incompatible entries.

DLL 1's import table 140, shown in FIG. 6A, includes a reference to a function contained within DLL 2. This entry indicates that the function to be loaded at this location in the import table is located in DLL 2's import table 142 and is called fA. When an application is compatible, the fA reference in import table 140 is replaced with the actual location of the function located within DLL 2. In this example, if the application was compatible the fA in DLL 1 would be replaced with fA(0x0005) as contained within DLL 2. The operating system replaces the reference in DLL 1 of fA and DLL 2 with the actual value of fA found in DLL 2. In an incompatible application, however, any function that is determined to be incompatible will have the incompatible function replaced with the value contained within the Hook DLL. The Hook DLL's import table 144 illustrates that fA actually has a value of 0x0001, as compared to 0x0005 as contained within DLL 2 than what is contained in DLL 2 due to the incompatibility of the function. Therefore, any reference to fA in any of the identified DLLs needs to have the value of fA in the import table replaced with the value contained within the Hook DLL.

FIG. 6B illustrates the replacement of fA contained within DLL 2's import table 142, with the corrected address contained within the Hook DLL. As can be seen by referring to FIG. 6B, the compatible version of the function fA is 0x0001. This value is inserted into DLL 2's import table 142, thereby replacing the previous value of 0x0005. Any other references to fA located within DLL 2 will also be replaced with the patched version of the function.

FIG. 6C illustrates replacing the reference to fA contained within DLL 1's import table 140 with the corrected value of fA that is contained within DLL 2's import table 142. Referring to DLL 1's import table 140 it can be seen that the reference has been replaced with 0x001. At this point, in the example, all of the references to the incompatible functions have been replaced with the corrected locations of the functions, as contained within the Hook DLL.

For each function that has been identified as incompatible, the Shim DLL will search through the identified DLLs, or all of the application's DLLs if NULL is indicated in the Structure Hook API, and replace all of the references to the incompatible function with the values contained within the Hook DLL. Once these references are patched the application is run. Instead of the application calling the incompatible functions, however, the application calls the compatible stub functions.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for patching an application that is incompatible with an operating system, wherein the application has an associated address space, and a dynamic link library, the dynamic link library containing functions and having an associated import table containing function pointers, the method comprising:
   (a) starting the application;
   (b) determining if the application is compatible or incompatible with the operating system by determining if information about the application is included in information that identifies applications that are incompatible with the operating system;
   (c) inserting a shim dynamic link library within the application's address space if the application is incompatible with the operating system, the shim dynamic link library:
       (i) determining the functions of the incompatible application that need to be patched; and
       (ii) patching the functions of the incompatible application that need to be patched; and
   (d) running the application.

2. The method of claim 1, further comprising:
   (a) installing a hook if the application is incompatible, the hook:
       (i) dynamically determining when a call has been made to load a dynamic link library;
       (ii) notifying the shim dynamic link library when a call has been made to load a dynamic link library; and
       (iii) dynamically determining what functions are incompatible with the operating system; and
   (b) the shim dynamic link library dynamically patching the functions of the incompatible application that need to be patched.

3. The method of claim 1, wherein determining if information about the application is included in information that identifies applications that are incompatible with the operating system comprises:
   (a) determining if at least one identifying attribute of a plurality of identifying attributes of the started application matches at least one identifying attribute of a plurality of identifying attributes of incompatible applications; and
   (b) if at least one of the identifying attributes matches, determining that the running application is incompatible, otherwise determining that the running application is compatible.

4. The method of claim 3, wherein determining if information about the application is included in information that identifies applications that are incompatible with the operating system further comprises:
   storing identifying attributes of incompatible applications; and
   retrieving at least one of the stored identifying attributes for determining if at least one identifying attribute of a plurality of identifying attributes of the started application matches at least one of the stored identifying attributes of incompatible applications.

5. The method of claim 4, wherein determining if information about the application is included in information that identifies applications that are incompatible with the operating system further comprises:
   comparing additional identifying attributes of the started application with the stored identifying attributes of incompatible applications; and
   if the identifying attributes match, determining that the application is incompatible.

6. The method of claim 5, wherein the shim dynamic link library's determination of what functions of the incompatible application need to be patched comprises:
   (a) loading a hook dynamic link library into the application's address space, the hook dynamic link library:
      (i) containing a list of incompatible functions; and
      (ii) containing a group of stub functions for patching the list of incompatible functions; and
   (b) the shim dynamic link library accessing the list of incompatible functions from the hook library and applying the group of stub functions to the functions of the incompatible application.

7. The method of claim 6, wherein patching the incompatible functions of the incompatible application further comprises:
   (a) loading the started application's dynamic link library;
   (b) locating the incompatible functions within the loaded application's dynamic link library; and
   (c) replacing the incompatible functions within the loaded application's dynamic link library with the stub functions.

8. A method for patching an application that is incompatible with an operating system, wherein the application has an associated address space and a dynamic link library, the dynamic link library containing functions and having an associated import table containing function pointers, the method comprising:
   (a) running the application;
   (b) determining if the application is compatible or incompatible with the operating system by determining if information about the application is included in information that identifies applications that are incompatible with the operating system; and
   (c) if the application is incompatible, installing a hook, the hook:
      (i) dynamically determining when a call has been made to load a dynamic link library;
      (ii) dynamically determining what functions are incompatible with the operating system; and
      (iii) patching the incompatible functions.

9. The method of claim 8, further comprising:
   (a) installing a shim dynamic link library into the application's address space capable of receiving notification that a call has been made to load a dynamic link library;
   (b) the hook notifying the shim dynamic link library when a call has been intercepted; and
   (c) the shim dynamic link library patching the incompatible functions.

10. The method of claim 9, wherein determining if information about the application is included in information that identifies applications that are incompatible with the operating system comprises:
    (a) determining if at least one identifying attribute of a plurality of identifying attributes of the running application matches at least one identifying attribute of a plurality of identifying attributes of incompatible applications; and
    (b) if at least one of the identifying attributes matches, determining that the running application is incompatible, otherwise determining that the running application is compatible.

11. The method of claim 10, wherein determining if information about the application is included in information that identifies applications that are incompatible with the operating system further comprises:
    (a) storing identifying attributes of incompatible applications; and
    (b) retrieving at least one of the stored identifying attributes for determining if at least one identifying attribute of a plurality of identifying attributes of the running application matches at least one of the stored identifying attributes of incompatible applications.

12. The method of claim 11, wherein determining if information about the application is included in information that identifies applications that are incompatible with the operating system further comprises:
    comparing additional identifying attributes of the running application with the stored identifying attributes of incompatible applications; and
    if the identifying attributes match, determining that the application is incompatible.

13. The method of claim 12, wherein the shim dynamic library:
    (a) loads a hook dynamic link library containing a group of incompatible functions; and
    (b) patches the application based on the group of incompatible functions.

14. A computer-readable medium having computer executable instructions for patching an application that is incompatible with an operating system, wherein the application has an associated address space and a dynamic link library, the dynamic link library containing functions and having an associated import table containing function pointers, which when executed, comprise:
    (a) starting the application;
    (b) determining if the application is compatible or incompatible with the operating system by determining if information about the application is included in information that identifies applications that are incompatible with the operating system;
    (c) inserting a shim dynamic link library within the application's address space if the application is incompatible with the operating system, the shim dynamic link library:
       (i) determining the functions of the incompatible application that need to be patched; and
       (ii) patching the incompatible functions of the incompatible application that need to be patched; and
    (d) running the application.

15. The computer-readable medium of claim 14, wherein determining if information about the application is included in information that identifies applications that are incompatible with the operating system comprises:
  (a) determining if at least one identifying attribute of a plurality of identifying attributes of the started application matches at least one identifying attribute of a plurality of identifying attributes of incompatible applications; and
  (b) if at least one of the identifying attributes matches, determining that the running application is incompatible, otherwise determining that the running application is compatible.

16. The computer-readable medium of claim 15, wherein determining if information about the application is included in information that identifies applications that are incompatible with the operating system further comprises:
  storing identifying attributes of incompatible applications; and
  retrieving at least one of the stored identifying attributes for determining if at least one identifying attribute of a plurality of identifying attributes of the started application matches the at least one of the stored identifying attributes of incompatible applications.

17. The computer-readable medium of claim 16, wherein determining if information about the application is included in information that identifies applications that are incompatible with the operating system further comprises:
  (a) comparing additional identifying attributes of the started application with the stored identifying attributes of incompatible applications; and
  (b) if the identifying attributes match, determining that the application is incompatible.

18. The computer-readable medium of claim 17, wherein the shim dynamic link library's determination of what functions of the incompatible application need to be patched comprises:
  (a) loading a hook dynamic link library into the application's address space, the hook dynamic link library:
    (i) containing a list of incompatible functions; and
    (ii) containing a group of stub functions for patching the list of incompatible functions; and
  (b) the shim dynamic link library accessing the list of incompatible functions from the hook library and applying the group of stub functions to the functions of the incompatible application.

19. The computer-readable medium of claim 18, wherein patching the incompatible functions of the incompatible application further comprises:
  (a) loading the started application's dynamic link library;
  (b) locating the incompatible functions within the loaded application's dynamic link library; and
  (c) replacing the incompatible functions within the loaded application's dynamic link library with the stub functions.

20. A computer-readable medium having computer executable instructions for patching an application that is incompatible with an operating system, wherein the application has an associated address space and a dynamic link library, the dynamic link library containing functions and having an associated import table containing function pointers, which when executed, comprise:
  (a) running the application;
  (b) determining if the application is compatible or incompatible with the operating system by determining if information about the application is included in information that identifies applications that are incompatible with the operating system; and
  (c) if the application is incompatible, installing a hook, the hook:
    (i) dynamically determining when a call has been made to load a dynamic link library;
    (ii) dynamically determining what functions are incompatible with the operating system; and
    (iii) patching the incompatible functions.

21. The computer-readable medium of claim 20, further comprising:
  (a) installing a shim dynamic link library into the application's address space; and
  (b) the hook notifying the shim dynamic link library when a call has been intercepted.

22. The computer-readable medium of claim 21, wherein determining if information about the application is included in information that identifies applications that are incompatible with the operating system further comprises:
  (a) determining if at least one identifying attribute of a plurality of identifying attributes of the running application matches at least one identifying attribute of a plurality of identifying attributes of incompatible applications; and
  (b) if at least one of the identifying attributes matches, determining that the running application is incompatible, otherwise determining that the running application is compatible.

23. The computer-readable medium of claim 22, wherein determining if information about the application is included in information that identifies applications that are incompatible with the operating system comprises:
  (a) storing identifying attributes of incompatible applications; and
  (b) retrieving at least one of the stored identifying attributes for determining if at least one identifying attribute of a plurality of identifying attributes of the running application matches the at least one of the stored identifying attributes of incompatible applications.

24. The computer-readable medium of claim 23, wherein determining if information about the application is included in information that identifies applications that are incompatible with the operating system further comprises:
  comparing additional identifying attributes of the running application with the stored identifying attributes of incompatible applications; and
  if the identifying attributes match, determining that the application is incompatible.

25. The computer-readable medium of claim 24, wherein the shim dynamic library:
  (a) loads a hook dynamic link library containing a group of incompatible functions; and
  (b) patches the application based on the group of incompatible functions.

26. A computer system for patching an application that is incompatible with an operating system, wherein the computer system is capable of running an application having an associated address space and a dynamic link library, the dynamic link library containing functions and having an associated import table containing function pointers, the method comprising:
  (a) starting the application;
  (b) determining if the application is compatible or incompatible with the operating system by determining if information about the application is included in information that identifies applications that are incompatible with the operating system;

(c) inserting a shim dynamic link library within the application's address space if the application is incompatible with the operating system, the shim dynamic link library:

(i) determining the functions of the incompatible application that need to be patched; and (ii) patching the incompatible functions of the incompatible application that need to be patched; and (d) running the application.

27. The computer system of claim 26, wherein determining if information about the application is included in information that identifies applications that are incompatible with the operating system comprises:

(a) determining if at least one identifying attribute of a plurality of identifying attributes of the started application matches at least one identifying attribute of a plurality of identifying attributes of incompatible applications; and (b) if at least one of the identifying attributes matches, determining that the running application is incompatible, otherwise determining that the running application is compatible.

28. The computer system of claim 27, wherein determining if information about the application is included in information that identifies applications that are incompatible with the operating system further comprises:

storing identifying attributes of incompatible applications; and retrieving at least one of the stored identifying attributes for determining if at least one identifying attribute of a plurality of identifying attributes of the started application matches the at least one of the stored identifying attributes of incompatible applications.

29. The computer system of claim 28, wherein determining if information about the application is included in information that identifies applications that are incompatible with the operating system further comprises:

comparing additional identifying attributes of the started application with the stored identifying attributes of incompatible applications; and if the identifying attributes match, determining that the application is incompatible.

30. The computer system of claim 29, wherein the shim dynamic link library's determination of what functions of the incompatible application need to be patched comprises:

(a) loading a hook dynamic link library into the application's address space, the hook dynamic link library:

(i) containing a list of incompatible functions; and (ii) containing a group of stub functions for patching the list of incompatible functions; and (b) the shim dynamic link library accessing the list of incompatible functions from the hook library and applying the group of stub functions to the functions of the incompatible application.

31. The computer system of claim 30, wherein patching the incompatible functions of the incompatible application comprises:

(a) loading the started application's dynamic link library;

(b) locating the incompatible functions within the loaded application's dynamic link library; and (c) replacing the incompatible functions within the loaded application's dynamic link library with the stub functions.

32. A computer system for patching an application that is incompatible with an operating system, wherein the application has an associated address space and a dynamic link library, the dynamic link library containing functions and having an associated import table containing function pointers, the method comprising:

(a) running the application;

(b) determining if the application is compatible or incompatible with the operating system by determining if information about the application is included in information that identifies applications that are incompatible with the operating system; and (c) if the application is incompatible, installing a hook, the hook:

(i) dynamically determining when a call has been made to load a dynamic link library;

(ii) dynamically determining what functions are incompatible with the operating system; and (iii) patching the incompatible functions.

33. The computer system of claim 32, further comprising:

(a) installing a shim dynamic link library into the application's address space; and (b) the hook notifying the shim dynamic link library when a call has been intercepted.

34. The computer system of claim 33, wherein determining if information about the application is included in information that identifies applications that are incompatible with the operating system comprises:

(a) determining if at least one identifying attribute of a plurality of identifying attributes of the running application matches at least one identifying attribute of a plurality of identifying attributes of incompatible applications; and (b) if at least one of the identifying attributes matches, determining that the running application is incompatible, otherwise determining that the running application is compatible.

35. The computer system of claim 34, wherein determining if information about the application is included in information that identifies applications that are incompatible with the operating system comprises:

(a) storing identifying attributes of incompatible applications; and (b) retrieving at least one of the stored identifying attributes for determining if at least one identifying attribute of a plurality of identifying attributes of the running application matches the at least one of the stored identifying attributes of incompatible applications.

36. The computer system of claim 35, wherein determining if information about the application is included in information that identifies applications that are incompatible with the operating system further comprises:

comparing additional identifying attributes of the running application with the stored identifying attributes of incompatible applications; and if the identifying attributes match, determining that the application is incompatible.

37. The computer system of claim 36, wherein the shim dynamic library:

(a) loads a hook dynamic link library containing a group of incompatible functions; and (b) patches the application based on the group of incompatible functions.

* * * * *

UNITED STATES PATENT AND TRADEMARK OFFICE
CERTIFICATE OF CORRECTION

PATENT NO.       : 6,745,385 B1
APPLICATION NO.  : 09/513016
DATED            : June 1, 2004
INVENTOR(S)      : C.I. Lupu et al.

It is certified that error appears in the above-identified patent and that said Letters Patent is hereby corrected as shown below:

| COLUMN | LINE | ERROR |
| --- | --- | --- |
| 2 | 20 | "complex operating system" should read --complex operating system,"-- |
| 2 | 48 | "database then" should read --database, then-- |
| 5 | 23 | "to the." should read --to the-- |
| 6 | 7 | "checked, include" should read --checked include-- |
| 6 | 31 | "above on" should read --above, on-- |
| 6 | 37-38 | "regedi-<br>t,exe" should break --reg-<br>edit.exe-- |
| 7 | 10 | "above, the" should read --above, and the-- |
| 7 | 25 | "which, is" should read --which is-- |
| 7 | 27 | "or ordinary" should read --of ordinary-- |
| 7 | 31 | "application but also" should read --application, but also-- |
| 8 | 8 | "(See" should read --(see-- |

UNITED STATES PATENT AND TRADEMARK OFFICE
CERTIFICATE OF CORRECTION

PATENT NO. : 6,745,385 B1
APPLICATION NO. : 09/513016
DATED : June 1, 2004
INVENTOR(S) : C.I. Lupu et al.

It is certified that error appears in the above-identified patent and that said Letters Patent is hereby corrected as shown below:

| COLUMN | LINE | ERROR |
|---|---|---|
| 8 | 52 | "applications functions" should read --application's functions-- |
| 9 | 9 | "that are contained" should read --that is contained-- |
| 9 | 55 | "DLL2 than" should read --DLL2, rather than-- |
| 9 | 55 | "DLL2 due" should read --DLL2, due-- |
| 10 | 4 | "table 140" should read --table 140,-- |
| 12 (Claim 14, line 10) | 54 | "bv" should read --by-- |

Signed and Sealed this

Fifth Day of December, 2006

JON W. DUDAS
*Director of the United States Patent and Trademark Office*